(12) United States Patent
Shin et al.

(10) Patent No.: US 11,094,323 B2
(45) Date of Patent: Aug. 17, 2021

(54) ELECTRONIC DEVICE AND METHOD FOR PROCESSING AUDIO SIGNAL BY ELECTRONIC DEVICE

(71) Applicant: SAMSUNG ELECTRONICS CO., LTD., Suwon-si (KR)

(72) Inventors: Ki-hoon Shin, Yongin-si (KR); Myung-suk Song, Seoul (KR); Jong-uk Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 16/333,369

(22) PCT Filed: Jun. 27, 2017

(86) PCT No.: PCT/KR2017/006793
§ 371 (c)(1),
(2) Date: Mar. 14, 2019

(87) PCT Pub. No.: WO2018/070639
PCT Pub. Date: Apr. 19, 2018

(65) Prior Publication Data
US 2019/0214011 A1    Jul. 11, 2019

(30) Foreign Application Priority Data
Oct. 14, 2016    (KR) .................. 10-2016-0133386

(51) Int. Cl.
*G10L 15/22*         (2006.01)
*G10L 15/28*         (2013.01)
(Continued)

(52) U.S. Cl.
CPC .............. *G10L 15/22* (2013.01); *G10L 15/28* (2013.01); *G10L 15/285* (2013.01);
(Continued)

(58) Field of Classification Search
CPC . G01I 15/22; G01I 15/28; G01I 15/285; G01I 21/0216; G01I 21/0272; G01I 21/028; G01I 25/87; G01I 2015/223
See application file for complete search history.

(56) References Cited

U.S. PATENT DOCUMENTS 5,884,257 A    3/1999    Maekawa et al.
6,471,420 B1   10/2002   Maekawa et al.
(Continued)

FOREIGN PATENT DOCUMENTS

JP    2008-309966 A    12/2008
JP    2012-198289 A    10/2012
(Continued)

OTHER PUBLICATIONS

Communication dated Jun. 24, 2019, from the European Patent Office in counterpart European Application No. 17860062.3.
(Continued)

*Primary Examiner* — Sonia L Gay
(74) *Attorney, Agent, or Firm* — Sughrue Mion, PLLC

(57) ABSTRACT

An electronic device is disclosed. The electronic device comprises: multiple microphones for receiving audio signals generated by multiple sound sources; a communication unit for communicating with a voice recognition server; and a processor for determining the direction in which each of the multiple sound sources is located with reference to the electronic device, on the basis of the multiple audio signals received through the multiple microphones, determining at least one target sound source among the multiple sound sources on the basis of the duration of the determined direction of each of the sound sources, and controlling the communication unit such that the communication unit transmits, to the voice recognition server, an audio signal of a
(Continued)

target sound source from which a predetermined voice is generated among the at least one target sound source.

13 Claims, 9 Drawing Sheets

(51) Int. Cl.
    *G10L 21/0216*     (2013.01)
    *G10L 21/0272*     (2013.01)
    *G10L 21/028*     (2013.01)
    *G10L 25/87*     (2013.01)

(52) U.S. Cl.
    CPC ........ *G10L 21/028* (2013.01); *G10L 21/0216* (2013.01); *G10L 21/0272* (2013.01); *G10L 25/87* (2013.01); *G10L 2015/223* (2013.01); *G10L 2021/02166* (2013.01)

(56) References Cited

U.S. PATENT DOCUMENTS

| | | | |
|---|---|---|---|
| 8,775,173 B2 | 7/2014 | Matsumoto | |
| 9,601,132 B2 | 3/2017 | Son et al. | |
| 9,697,822 B1* | 7/2017 | Naik | G10L 15/22 |
| 9,734,845 B1* | 8/2017 | Liu | H04R 3/005 |
| 9,947,339 B2 | 4/2018 | Son et al. | |
| 10,043,537 B2 | 8/2018 | Jang et al. | |
| 10,056,078 B1* | 8/2018 | Shepherd | G06Q 20/12 |
| 10,409,552 B1* | 9/2019 | Jara | G10L 15/05 |
| 2013/0039504 A1* | 2/2013 | Pandey | H04M 3/568 381/71.1 |
| 2014/0067402 A1* | 3/2014 | Kim | G06F 16/632 704/270.1 |
| 2014/0219471 A1 | 8/2014 | Deshpande et al. | |
| 2014/0241549 A1 | 8/2014 | Stachurski et al. | |
| 2015/0095026 A1 | 4/2015 | Bisani et al. | |
| 2015/0331490 A1 | 11/2015 | Yamada | |
| 2016/0125883 A1 | 5/2016 | Koya | |

FOREIGN PATENT DOCUMENTS

| | | |
|---|---|---|
| JP | 2016-42613 A | 3/2016 |
| JP | 2016-80750 A | 5/2016 |
| KR | 10-0215946 B1 | 8/1999 |
| KR | 10-2014-0060040 A | 5/2014 |
| KR | 10-2016-0026457 A | 3/2016 |
| KR | 10-2016-0034855 A | 3/2016 |
| KR | 10-2016-0049347 A | 5/2016 |

OTHER PUBLICATIONS

International Search Report dated Oct. 17, 2017 by the International Searching Authority in counterpart International Patent Application No. PCT/KR2017/006793. (PCT/ISA/210).

Written Opinion dated Oct. 17, 2017 by the International Searching Authority in counterpart International Patent Application No. PCT/KR2017/006793. (PCT/Isa/237).

* cited by examiner

ELECTRONIC DEVICE AND METHOD FOR PROCESSING AUDIO SIGNAL BY ELECTRONIC DEVICE

TECHNICAL FIELD

The disclosure relates to an electronic device and a method for processing an audio signal. More particularly, the disclosure relates to an electronic device processing audio signals for voice recognition and a method for processing audio signals of the electronic device.

DESCRIPTION OF RELATED ART

The recent advancement of Internet of Things (IoT) technology, etc. has emphasized a technique for controlling various electronic devices through user's voice.

In general, when a user utters voice for controlling a particular device, the uttered voice is recognized via a microphone and recognized via a voice recognizer and accordingly, a device to be controlled can be controlled.

In this case, a noise environment with a low signal to noise ratio (SNR), the performance of the voice recognizer is deteriorated significantly, and to improve resistance to noise of the voice recognizer, various signal processing (or preprocessing) techniques such as a microphone-array technique and the like can be used.

The microphone-array technology is a technique to strengthen a sound source (user's voice) of a destination direction by means of a number of microphones, and to eliminate a sound source (noise) incident from the other directions. As described above, noise is eliminated by preprocessing based on a microphone-array and an audio signal of which a voice has been strengthened is transferred to the voice recognizer, enabling improved voice recognition even in noise environments.

In addition, a multi-modal voice preprocessing technique to recognize a user's face via a camera and utilize the result thereof is used. However, this technique has a drawback of privacy invasion through image exposure or an increase in costs due to use of additional equipment. Thus, a technique of selecting a target sound source solely by a microphone without a camera has been further emphasized.

Meanwhile, when a user controls various electronic devices through voice, a scenario to remotely control the electronic devices by means of an additional electronic device providing microphone-array and voice recognition functions may be present. In this case, in a case that the electronic device to be controlled is an audio reproduction device such as TV, Bluetooth audio device and the like, the audio output thereof has a higher level and stronger directivity than normal background noise, and thus the voice recognition performance of the electronic device can be significantly deteriorated.

In addition, voice when a person normally calls the other person has large energy and high pitch as compared with voice uttered when the attraction of the other person has been drawn. From the voice recognition point of view, it denotes that a user's utterance input to a trigger recognizer has sufficiently high energy and pitch, but a user's utterance that a word/sentence recognizer needs to recognize after trigger recognition may be relatively less of energy. Accordingly, a failure of recognition of an instruction for controlling an electronic device after trigger recognition easily occurs in a noise environment.

DETAILED DESCRIPTION

Technical Problem

Aspects of the disclosure are to address at least the above-mentioned problems and/or disadvantages and to provide at least the advantages described below. Accordingly, an aspect of the disclosure is to provide an electronic device for accurately determining a target sound source for voice recognition among multiple external sound sources and effectively recognizing voice, and a method for processing audio signals of the electronic device.

Solution to Problem

In accordance with an aspect of the disclosure, an electronic device is provided. The electronic device includes multiple microphones for receiving audio signals generated by multiple sound sources, a communication unit for communicating with a voice recognition server, and a processor for determining a direction in which each of the multiple sound sources is located with reference to the electronic device, on the basis of the multiple audio signals received through the multiple microphones, determining at least one target sound source among the multiple sound sources on the basis of a duration of the determined direction of each of the sound sources, and controlling the communication unit such that the communication unit transmits, to the voice recognition server, an audio signal of a target sound source from which a predetermined voice is generated among the at least one target sound source.

The processor may determine at least one sound source generating an audio signal from a same direction for less than a predetermined time among the multiple sound sources as a target sound source.

The processor may separate an audio signal of each of multiple sound sources from an audio signal received from each of the multiple sound sources, and perform voice recognition of the separated multiple audio signals and determine a target sound source from which the predetermined voice is generated.

The processor may control the communication unit such that the communication unit transmits, to the voice recognition server, only an audio signal of the target sound source identified to generate the predetermined voice among an audio signal received from each of the multiple microphones after a target sound source from which the predetermined voice is generated is determined.

The processor may determine a target sound source generating a voice among the at least one target sound source, and perform voice recognition of only an audio signal of a target sound source determined to generate the voice, and determine a target sound source from which the predetermined voice is generated.

The processor may determine a target sound source generating voice among the at least one target sound source, and perform voice recognition of only an audio signal of a target sound source determined to generate the voice and determine a target sound source from which the predetermined voice is generated.

The processor may determine a direction in which each of the multiple sound sources is present in a less number than a number of the multiple microphones.

The electronic device may further include a display unit for displaying a direction in which a target sound source from which the predetermined voice is generated is present with reference to the electronic device.

In accordance with another aspect of the disclosure, a method for processing an audio signal of an electronic device is provided. The method includes receiving audio signals generated by multiple sound sources, determining a direction in which each of the multiple sound sources is located with reference to the electronic device, on the basis of the multiple audio signals received through the multiple microphones, determining at least one target sound source among the multiple sound sources on the basis of a duration of the determined direction of each of the sound sources, and transmitting, to the voice recognition server, an audio signal of a target sound source from which a predetermined voice is generated among the at least one target sound source.

The determining the at least one target sound source may include determining at least one sound source generating an audio signal from a same direction for less than a predetermined time among the multiple sound sources as a target sound source.

The method may include separating an audio signal of each of the multiple sound sources among an audio signal received from each of the multiple microphones, and performing voice recognition of the separated multiple audio signals as a target sound source and determining a target sound source from which the predetermined voice is generated.

The transmitting to the voice recognition server may include transmitting, to the voice recognition server, only an audio signal of the target sound source identified to generate the predetermined voice among an audio signal received from each of the multiple microphones after a target sound source from which the predetermined voice is generated is determined.

The method may include, if only one target sound source is present, separating only an audio signal of the target sound source from an audio signal received from each of the multiple microphones, and performing voice recognition of an audio signal of the separated target sound source and determine whether the predetermined voice is generated.

The method may include determining a target sound source generating a voice among the at least one target sound source, and performing voice recognition of only an audio signal of a target sound source determined to generate the voice, and determining a target sound source from which the predetermined voice is generated.

The determining the direction may include determining a direction in which each of the multiple sound sources is present in a less number than a number of the multiple microphones.

The method may include displaying a direction in which a target sound source from which the predetermined voice is generated is present with reference to the electronic device.

In accordance with another aspect of the disclosure, a computer-readable recording medium is provided. The computer-readable recording medium includes a program to perform a method for processing an audio signal of an electronic device, the method comprising: receiving audio signals generated by multiple sound sources; determining a direction in which each of the multiple sound sources is located with reference to the electronic device, on the basis of the multiple audio signals received through the multiple microphones; determining at least one target sound source among the multiple sound sources on the basis of a duration of the determined direction of each of the sound sources; and transmitting, to the voice recognition server, an audio signal of a target sound source from which a predetermined voice is generated among the at least one target sound source.

Effect of the Invention

According to the various example embodiments, it is possible to accurately determine a target sound source for voice recognition among multiple external sound sources and effectively recognize voice, thereby enabling stable voice recognition even in various noise environments.

PREFERRED EMBODIMENTS FOR CARRYING OUT THE INVENTION

In the following description, well-known functions or constructions are not described in detail since they would obscure the application with unnecessary detail. The terms used in the following description are provided to explain example embodiments and are not intended to limit the scope. It is to be understood that the singular forms "a," "an," and "the" include plural referents unless the context clearly dictates otherwise.

Throughout this specification, it will be understood that the term "comprise" and variations thereof, such as "comprising" and "comprises", specify the presence of features, numbers, steps, operations, components, parts, or combinations thereof, described in the specification, but do not preclude the presence or addition of one or more other features, numbers, steps, operations, components, parts, or combinations thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not illustrated).

Hereinafter, the present disclosure will be described in detail with reference to the accompanying drawings.

A voice recognition environment according to an example embodiment may include an electronic device for receiving audio signals generated in multiple external sound sources including a user and determining a target sound source (for example, the user), and transmitting an audio signal of the determined target sound source, a voice recognition server performing voice recognition for an audio signal received from the electronic device, and an external device performing an operation corresponding to the recognized voice. Accordingly, the user may control an external device through the electronic device.

Here, the external device is an electronic device of various types which may be controlled through user's voice, which may be various audio reproduction devices such as TV, electronic frame, Bluetooth audio, sound bar, and the like. However, the example is not limited thereto, and it may include various home appliances such as a refrigerator, a washing machine, an air conditioner, and the like.

Figure 1:
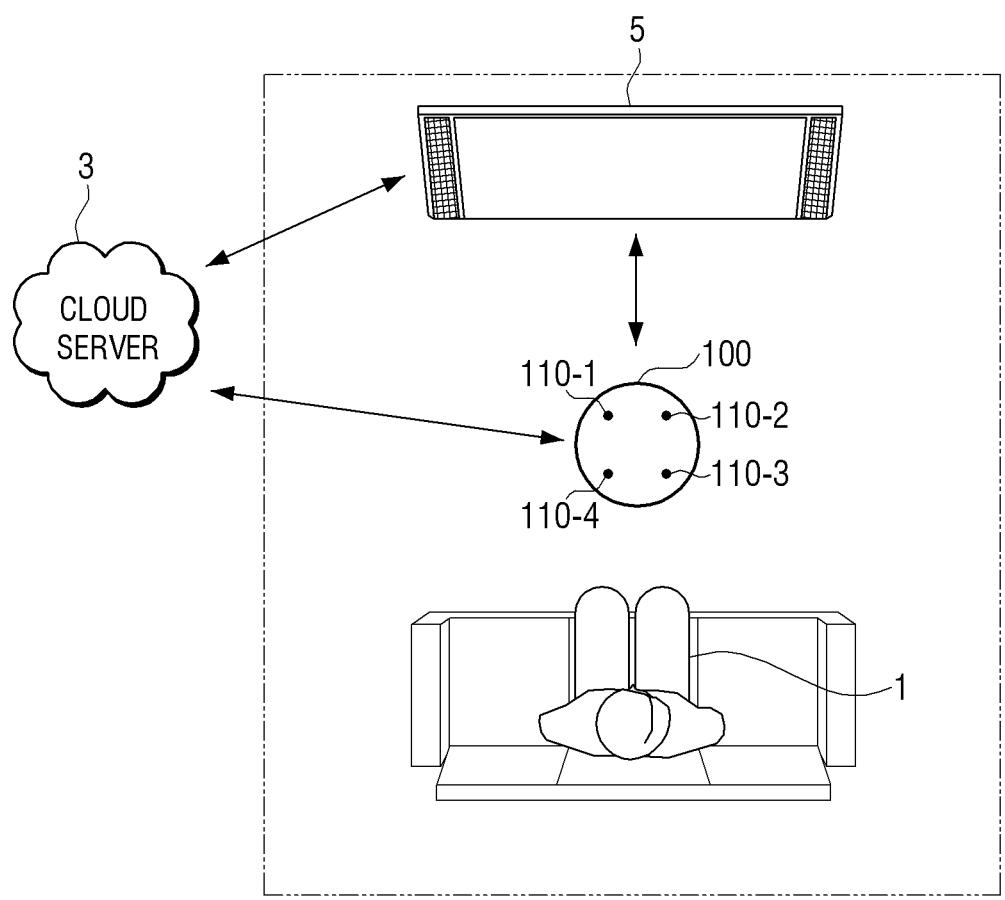
FIG. 1 is a diagram illustrating an example voice recognition environment through an electronic device, according to an example embodiment.

FIG. 1 is a diagram illustrating an example voice recognition environment through an electronic device 100, according to an example embodiment. Referring to FIG. 1, the voice recognition environment 10 may include an electronic device 100 receiving a voice command uttered by a user 1 through multiple microphones 110-1 to 110-4, and transmitting the received voice command to a cloud server 3, a cloud server 3 performing voice recognition to an audio signal received from the electronic device 100, and a TV 5 performing an operation corresponding to voice recognized in the cloud server 3.

For example, the user 1 may utter a voice command "Turn up the volume" while watching the TV 5. In this case, the electronic device 100 may receive an audio signal generated in the TV 5 and an audio signal corresponding to voice uttered by the user, through the multiple microphones 110-1 to 110-4. The electronic device 100 may determine a target sound source (user) among two sound sources (TV and user) on the basis of the received audio signal, and transmit an audio signal generated in the determined target sound source to the cloud server 3.

In this case, the electronic device 100 may determine a direction in which each of the two sound sources is located with reference to the electronic device, on the basis of the received multiple audio signals, and determine a target sound source of a user direction on the basis of the duration of the determined direction of each of the sound sources. A specific description regarding this will be explained below.

Accordingly, the cloud server 3 may perform voice recognition for an audio signal received from the electronic device 100 and transmit the voice recognition result of "Turn up the volume" or transmit a control signal corresponding to the recognized voice to the TV 5, and the TV 5 may perform an operation of increasing the volume according to the received voice recognition result or the control signal.

As another example, the cloud server 3 may transmit a control signal corresponding to the voice recognition result or the recognized voice to the electronic device 100 rather than the TV 5, and in this case, the TV 5 may receive the voice recognition result or the control signal through the electronic device 100 and perform an operation of increasing the volume.

According to an example embodiment, the user may, to control operations of the TV 5, utter a control command after uttering a predetermined word or sentence, that is, a wake-up word or sentence. Here, the wake-up word is a word informing the electronic device 100 of the fact that the user will control an external device such as TV 5 through voice, which may be a word or sentence set by a designer when the electronic device 100 was manufactured. However, the example is not limited thereto, and in an implementation, it may be set by a user of the electronic device 100.

For example, in a case that the wake-up word is a word that calls the electronic device 100, such as "ABC", the user may first utter the predetermined voice "ABC", and then utter a control command for the TV 5 such as "Turn up the volume".

In this case, the electronic device 100 may first receive, through the multiple microphones 110-1 to 110-4, an audio signal corresponding to "ABC" uttered by the user together with an audio signal of a content reproduced on the TV 5 when the "ABC" was uttered, and determine a direction in which each of the two sound sources (the user and the TV) with reference to the electronic device 100 is located, on the basis of the received audio signal.

Accordingly, the electronic device 100 may determine a target sound source (the user) among the two sound sources on the basis of the duration of the determined user direction and the determined TV direction.

Upon voice recognition, when it is determined that predetermined voice, that is, "ABC", has been generated in a target source, the electronic device 100 may, among an audio signal thereafter received through the multiple microphones 110-1 to 110-4, that is, an audio signal corresponding to the utterance "Turn up the volume" of the user and an audio signal of a content reproduced on the TV 5 when the "Turn up the volume" is uttered, transmit, to the cloud server 3, an audio signal of a target sound source from which predetermined voice is generated, that is, an audio signal corresponding to "Turn up the volume" corresponding to user's utterance.

Then, the voice recognition through the cloud server 3 and an operation of the TV 3 is as described above.

Figure 2:
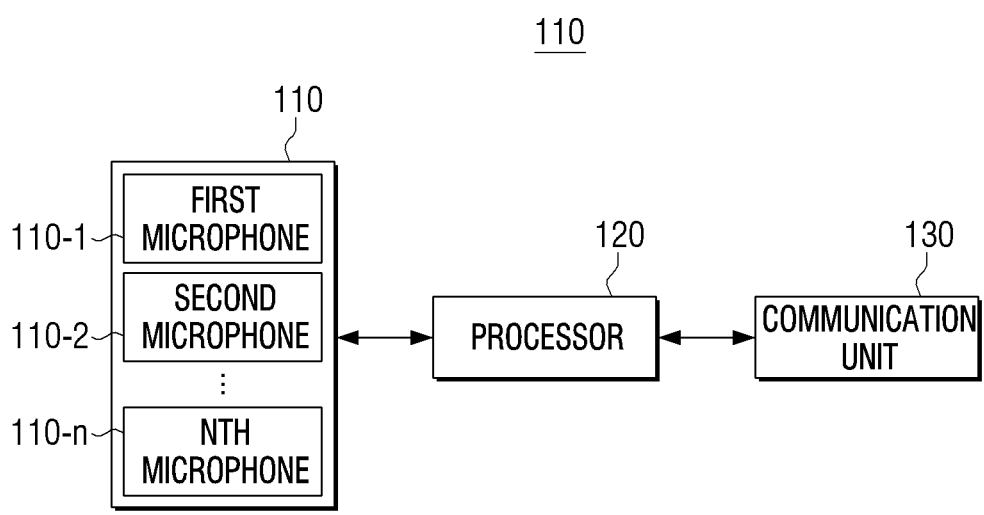
FIG. 2 is a block diagram illustrating a configuration of an electronic device, according to an example embodiment.

FIG. 2 is a block diagram illustrating a configuration of an electronic device, according to an example embodiment. As illustrated in FIG. 2, the electronic device 100 may include multiple microphones 110-1 to 110-$n$, a processor 120, and a communication unit 130.

The multiple microphones 110-1 to 110-$n$ may receive audio signals which are generated in multiple sound sources. In this case, the multiple sound sources are sources which is present within a predetermined range and generate audio signals, which may include a user of the electronic device 100, a third party other than the user of the electronic device 100, an audio reproduction device such as a TV, electronic frame, Bluetooth audio, sound bar surrounding the electronic device 100, and so on.

The multiple microphones 110-1 to 110-$n$ refers to multiple microphones which are provided in the electronic device 100, receives an audio signal in a sound wave form generated in an external sound source, and outputs the received audio signal as an electrical signal, irrespective of terms like "microphone-array", "array-microphone", "multichannel microphone", "multi-microphone", etc.

In this case, the number of microphones may be four. However, the example is not limited thereto, and the number of microphones and a location at which the respective microphones are arranged in the electronic device 100 may be experimentally determined by the manufacturer of the electronic device 100.

In a case that the multiple microphones 110-1 to 110-$n$ are included in a microphone-array, the microphone-array may be configured as a directional microphone, a non-directional microphone, or a directional microphone and a non-directional microphone in combination.

The communication unit 130 may communicate with a voice recognition server (not shown). Here, the voice recognition server (not shown) is a server on network providing a voice recognition function, which may be, for example, the cloud server 3 as in the example of FIG. 1. However, the example is not limited thereto, and it may be a normal additional server. In addition, the communication unit 130 may, according to an example embodiment, communicate with an external device (for example, the TV 5 in the example of FIG. 1) to be controlled through the electronic device 100.

For this purpose, the communication unit 130 may include at least one communication module among a near field wireless communication module (not illustrated) and a wireless LAN communication module (not illustrated). The near field wireless communication module (not illustrated) is a communication module which performs data communication wirelessly with an external device located nearby, which may be, for example, a Bluetooth module, a ZigBee module, an NFC module, and etc. Further, the wireless LAN communication module (not illustrated) is a module that is connected to an external network according to a wireless communication protocol such as WiFi, IEEE and the like to perform communications with an external server.

In addition, according to an example embodiment, the communication unit 130 may further include a mobile communication module which accesses a mobile communication network and performs communication according to various mobile communication standards such as 3rd Generation (3G), 3rd Generation Partnership (3GPP), Long Term Evolution (LTE) and the like, and may further include a wired communication module (not illustrated) according to communication standards such as High-Definition Multimedia Interface (HDMI), Universal Serial Bus (USB), Institute of Electrical and Electronics Engineers (IEEE) 1394, RS-232, and the like.

The processor 120 may control an overall operation of the electronic device 100. In particular, the processor 120 may determine a direction in which each of the multiple sound sources is present with reference to the electronic device, on the basis of the multiple audio signals received through the multiple microphones 110-1 to 110-n, and determine at least one target sound source among the multiple sound sources on the basis of the duration of the determined direction of each of the sound sources.

In detail, the processor 120 may generate angle information for each frame from the multiple audio signals received through the multiple microphones 110-1 to 110-n, and normalize the generated angle information and determine a direction in which each of the multiple sound sources is present. In addition, according to another example embodiment, the processor 120 may analyze phase information for each sound source of multiple audio signals received through the multiple microphones 110-1 to 110-n, and determine a direction in which each of the multiple sound sources is present. As described above, the processor 120 may determine a direction in which each of the sound sources generating an audio signal is present with reference to the electronic device 100, that is, a direction in which an audio signal generated in each of the sound sources reaches the electronic device 100.

In addition, the processor 120 may determine at least one target sound source on the basis of the duration of the determined direction in which each of the sound sources is present.

In general, an external device (not shown) such as TV and a sound bar is at a fixed position, and continuously outputs audio signals. Thus, a sound source caused by audio output of the external device (not shown) (for example, music output from a sound bar or a sound of a content reproduced on TV) has a longer duration of a direction in which a sound source determined by the processor 120 is present than a voice utterance of the user. Accordingly, according to an example embodiment, the processor 120 may determine at least one sound source generating an audio signal in the same direction for less than a predetermined time among multiple sound sources as a target sound source.

In this case, according to an example embodiment, in a case that a wake-up word for voice recognition or a control instruction list for controlling operations of an external device (not shown) is preset, the processor 120 may use a length of utterance of a wake-up word or a control instruction, that is, a length of predetermined voice, to determine a target sound source. For example, the processor 120 may determine a target sound source by identifying whether an audio signal generated in a sound source present in each direction is maintained for a duration for which predetermined voice is normally uttered.

As described above, according to various example embodiments, to maintain a direction in which a sound source is present may refer to that a direction in which an audio signal generated in a sound source reaches the electronic device 100 is maintained the same for a predetermined time or to that the generation of audio signals from a sound source is maintained for a predetermined time.

Meanwhile, according to an example embodiment, the processor 120 may, when determining a direction in which each of multiple sound sources is present, determine a direction where the number of sound sources is less than the number of multiple microphones 110-1 to 110-n. For example, if the number of multiple microphones 110-1 to 110-n, that is, n, is four, the processor 120 may determine a direction where the number of sound sources is three or less. However, this is only an example, and example embodiments are not limited to any specific examples.

The processor 120 may, as described above, determine a target sound source on the basis of the duration of a direction in which a sound source is present, and thus, in some cases, the sound source may be determined as a target sound source even when the corresponding sound source is not a voice utterance of the user. However, as will be described later, the processor 120 may finally determine a target sound source providing an audio signal to be transmitted to a voice recognition server (not shown) based on the wake-up word recognition result, and thereby the accuracy of voice recognition can be further increased.

That is, the processor 120 may control the communication unit 130 such that the communication unit 130 transmits, to the voice recognition server (not shown), an audio signal of a target sound source from which predetermined voice is generated among the at least determined one target sound source. Here, the predetermined voice refers to voice which corresponds to a wake-up word or to a trigger sentence.

In detail, the processor 120 may determine a target sound source from which predetermined voice is generated among at least one target sound source. For example, the processor 120 may separate an audio signal of each of the sound sources from an audio signal received from each of the plurality of microphones 110-1 to 110-n, perform voice recognition of the separated plurality of audio signals, and determine a target sound source from which the predetermined voice is generated on the basis of the voice recognition result.

Upon determination of a target source, if only one determined target sound sources is present, the processor 120 may separate only an audio signal of the determined target sound source from an audio signal received from each of the plurality of microphones 110-1 to 110-n, and perform voice recognition of an audio signal of the separated target sound source and determine whether the predetermined voice is generated. In this case, only one audio signal is separated and voice recognition is performed, thereby reducing computational complexity of the processor 120. The detail about separating an audio signal described above will be further explained in detail with reference to FIGS. 4 and 5.

As described above, when predetermined voice, that is, a target sound source from which a wake-up word is generated, is determined, the processor 120 may control the communication unit 130 such that the communication unit transmits, to the voice recognition server (not shown), only an audio signal of a target sound source from which predetermined voice is generated among audio signals received from each of the plurality of microphones 110-1 to 110-*n* after the target sound source from which the predetermined voice is generated is determined.

In this case, the processor 120 may separate only an audio signal of a target sound source from which the predetermined voice is generated among the audio signals received from each of the plurality of microphones 110-1 to 110-*n* after the target sound source from which the predetermined voice is generated is determined, and transmit the separated audio signal to the voice recognition server (not shown). Alternatively, the processor 120 may separate an audio signal of each of the plurality of sound sources, and then transmit, to the voice recognition server (not shown), only an audio signal of a target sound source from which the predetermined voice is generated among the separated audio signals.

According to an example embodiment, the processor 120 may be operated in a different way according to the number of the determined at least one target sound source. For example, if a plurality of target sound sources are present, a target sound source from which predetermined voice is generated may be determined by separating an audio signal of each of a plurality of sound sources from an audio signal received from each of the plurality of microphones 110-1 to 110-*n* and performing voice recognition of the separated plurality of audio signals. If one target sound source is present, it may be determined as to whether predetermined voice is generated by separating only an audio signal of a target sound source from an audio signal received from each of the plurality of microphones 110-1 to 110-*n* and performing voice recognition of the audio signal of the target sound source.

According to another example embodiment, the processor 120 may, as described above, determine a target sound source from which voice is generated among the determined at least one target source, and perform voice recognition of only an audio signal of the determined target sound source and determine a target sound source from which the predetermined voice is generated.

In detail, the processor 120 may separate an audio signal of each of a plurality of sound sources from an audio signal received from each of the plurality of microphones 110-1 to 110-*n*, acquire at least one characteristic from among a Mel-Frequency Cepstral Coefficient (MFCC), a Linear-Frequency Cepstral Coefficient (LFCC), Linear Prediction Coefficient (LPC), frequency envelope and Zero-Crossing Rate (ZCR) from each of the separated audio signals, and compare the acquired at least one characteristic with a characteristic of a pre-trained voice signal template and determine whether each of the separated audio signals is voice or not.

According to an example embodiment, the processor 120 may separate an audio signal of a sound source which is determined as a target sound source from an audio signal received from each of the plurality of microphones 110-1 to 110-*n*, acquire at least one characteristic from among the MFCC, LFCC, LPC, frequency envelope and ZCR from the separated audio signal, and compare the acquired at least one characteristic with a characteristic of a pre-trained voice signal template and determine whether or not the separated audio signal of the target sound source is voice.

Accordingly, the processor 120 may perform voice recognition of only the audio signal of the target source which is determined to generate voice, and determine a target sound source from which the predetermined voice is generated.

The processor 120 may, as described above, determine a target sound source on the basis of the duration of a direction in which a sound source is present, and thus, even when the voice is not user's voice, the sound source may be determined as a target sound source. However, as described above, voice recognition is performed only for an audio signal of a target sound source which is determined to generate human voice, thereby reducing computational complexity of the processor 120.

As described above, it is determined whether a wake-up word is uttered as well as a duration of the direction of a sound source and only an audio signal of a sound source in which the wake-up word is uttered is transmitted to the voice recognition server (not illustrated), thereby enabling more effective voice recognition in a noise environment.

Figure 3:
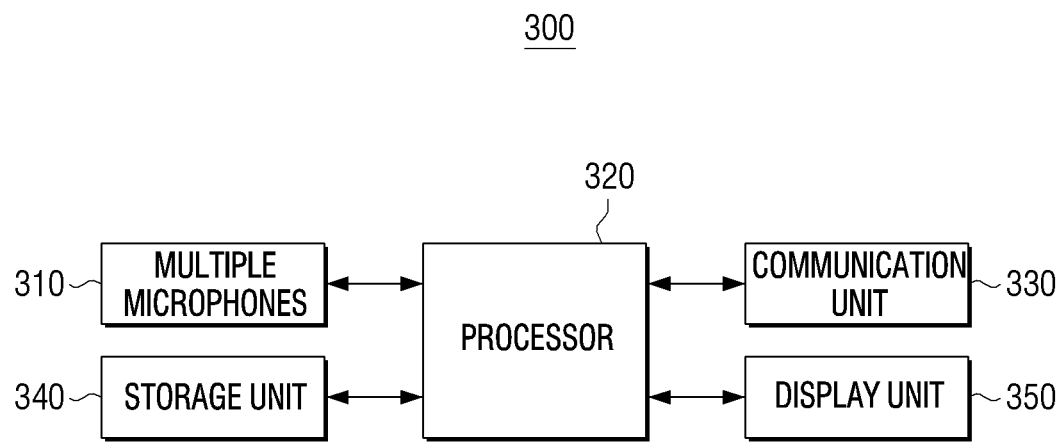
FIG. 3 is a block diagram illustrating a configuration of an electronic device, according to another example embodiment.

FIG. 3 is a block diagram illustrating a configuration of an electronic device, according to another example embodiment. As illustrated in FIG. 3, the electronic device 300 may include multiple microphones 310, a processor 320, a communication unit 330, a storage unit 340, and a display unit 350. Description for a portion of an electronic device 110 in FIG. 2 overlapping that of the electronic device 300 in FIG. 3 will be omitted.

The display unit 350 may display a direction which is determined as a user direction through wake-up word recognition, with reference to a location of the electronic device 300. In detail, the display unit 350 may, as described above with reference to FIG. 2, display a direction in which a target sound source from which predetermined voice is generated is present.

According to an example embodiment, the display unit 350 may include a plurality of LEDs. For example, the plurality of LEDs may be arranged to surround an outer circumference of the electronic device 300 at predetermined intervals. In this case, when a direction in which a target sound source from which predetermined voice is generated is determined, the processor 320 may control the display unit 350 to turn on or flicker an LED which is arranged closest to the corresponding direction among the plurality of LEDs and display a user direction. However, this is only an example, and a location at which the plurality of LEDs are arranged or a display method may be modified so that a particular direction may be indicated with reference to a location of the electronic device 300.

According to another example embodiment, the display unit 350 may include a display. In this case, the processor 320 may display various GUIs or text on a display and display a direction in which a target sound source from which predetermined voice is generated is present with reference to a location of the electronic device 300. To this end, the display may be implemented in various display technology such as Organic Light Emitting Diodes (OLED), Liquid Crystal Display (LCD) Panel, Plasma Display Panel (PDP), Vacuum Fluorescent Display (VFD), Field Emission Display (FED), Electro Luminescence Display (ELD), and the like, but may be, according to an embodiment, implemented as a touch screen including a touch panel.

Meanwhile, according to an example embodiment, the electronic device 300 may include a speaker (not shown). In this case, the processor 320 may output voice and notify a user of a direction in which a target sound source from which predetermined voice is generated is present with reference to the electronic device 300.

The storage unit 340 may store an operating system, various programs and data necessary for operating the electronic device 300. The storage unit 340 may include an internal memory or an external memory. The internal memory may include at least one of a volatile memory or a non-volatile memory. The volatile memory may be, for example, dynamic RAM (DRAM), static RAM (SRAM), synchronous dynamic RAM (SDRAM), or the like. The non-volatile memory may be, for example, one time programmable ROM (OTPROM), programmable ROM (PROM), erasable and programmable ROM (EPROM), electrically erasable and programmable ROM (EEPROM), mask ROM, flash ROM, NAN flash memory, NOR flash memory, and the like. In addition, the internal memory may be a Solid State Drive (SSD).

The external memory may include a flash drive, compact flash (CF), secure digital (SD), micro secure digital (Micro-SD), mini secure digital (Mini-SD), extreme digital (xD), memory stick, or the like. The external memory may be functionally connected to the electronic device 300 via various interfaces. In addition, the electronic device 300 may further include a storage device such as a hard drive.

Figure 4:
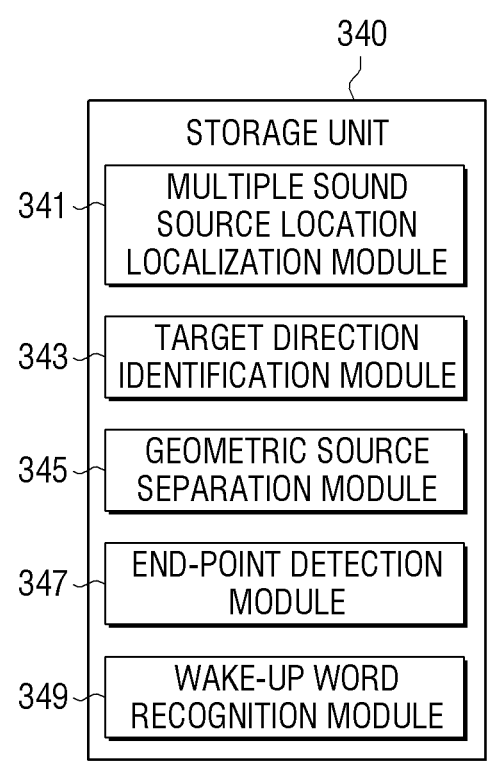
FIG. 4 is a diagram illustrating various example modules for operation of an electronic device, according to an example embodiment.

In particular, the storage unit 340 may, as illustrated in FIG. 4, include various modules for operation of the electronic device 100 and 300 according to the various example embodiments. Referring to FIG. 4, the storage unit 340 may include a multiple sound source localization module (MSSL) 341, a target direction identification module (TDI) 343, a geometric source separation module (GSS) 345, an end-point detection module (EPD) 347, and a wake-up word recognition module (WUW) 349.

The multiple sound source localization module (MSSL) 341 may estimate a direction from which the respective audio signals generated from an M number of sound sources reaches the electronic device 300 from an audio signal received and output from a plurality of microphones 310, for example an N-channel multiple microphone arrays and generate the M pieces of sound source direction information, and transfer the generated M pieces of sound source direction information to the target direction identification module (TDI) 343. In this case, the N may be a larger natural number than the M.

According to an example embodiment, the microphone-array technology may be applicable to the multiple sound source location localization module (MSSL) 341. In detail, the sound source location localization module (MSSL) 341 employing the microphone-array technology may serve to estimate an input direction of a sound source from the audio signals input to the plurality of microphones 310, and may include a by-frame angle estimation module (not shown) and a normalization module (not shown).

The by-frame angle estimation module (not shown) may generate target direction angle information from an input audio signal by frame. The normalization module (not shown) may receive input of the target direction angle information by frame, estimate a direction with high chances within a predetermined search range, and generate angle information which is normalized to one sound source, that is, sound source arrival direction information.

Meanwhile, the multiple sound source location localization module (MSSL) 341 employing the microphone-array technology according to an example embodiment may include a method of repeating the above-described sound source location localization M times in order to estimate a location of the M number of sound sources. For example, an arrival direction of the M number of sound sources may be estimated by applying the above-described sound source location localization method to an N-channel multiple audio input signal received via the N-channel multiple microphone array and generating a direction of a first sound source, and applying the above-described sound source location localization method to the same N-channel multiple audio input signal again and generating a direction of a second sound source.

The sound source location localization module (MSSL) 341 according to another example embodiment may generate phase information for each sound source by dividing the entire frequency of an audio signal input via the plurality of microphones 310 into several bands and analyzing a multiple audio input signal corresponding to the respective bands, and estimate a direction of arrival of the respective sound sources based on the generated phase information for each sound source. In detail, the sound source location localization module (MSSL) 341 may accumulate phase information of the generated sound source for each band and generate a histogram, and inversely combine directions of sound sources that may be included in that histogram and estimate the respective arrival directions of a plurality of sound sources.

The target direction identification module (TDI) 343 may receive the M number of sound source direction information generated by the multiple sound source location localization module 341 and a wake-up word recognition result of the wake-up word recognition module (WUW) 349 and detect a target sound source (or primary target (PT)), and generate target sound source direction information. According to an example embodiment, the target sound source direction information may be a combination of the M number of sound source direction information generated by the multiple sound source location localization module 341 with index information indicating whether the corresponding sound source direction is a target sound source or a noise sound source.

According to another example embodiment, the target sound source direction information may be a combination of the M number of sound source direction information generated by the multiple sound source location localization module 341 with index information indicating the ordinal number of the corresponding sound source.

For example, if only one of the M number of sound sources is voice, a first index may be assigned to the corresponding direction. If two or more sound sources correspond to voice, the corresponding direction may be moved to the top of the direction information list and a first index may be assigned to a direction from which the wake-up word is recognized. Then, only an audio signal of a sound source to which the first index is assigned is transmitted to the voice recognition server, and thereby an instruction (or sentence) uttered by the user may be selected from among the M number of sound sources separated after the wake-up word recognition and transmitted to the voice recognition server.

According to an example embodiment, the target direction identification module (TDI) 343 may generate the target sound source direction information on the basis of the duration of each sound source direction information. In detail, the target direction identification module (TDI) 343 may monitor a shift of direction (angle) during a predetermined time (sampling time or multiples thereof) for the M pieces if sound source direction information received from the multiple sound source location localization module (MSSL) 341, and calculate a time for which an angle of the corresponding sound source is maintained at the time of angle shift. Normally, a duration of a sound source (music, TV output, etc.) by audio output of an external device is longer than that of a voice utterance, and thus a sound source of which the duration is shorter than the predetermined time may be determined as a target sound source and target sound source direction information may be generated. In a case that a wake-up word or a particular instruction list for external device control is predetermined, a target sound source may be determined in consideration of a length of voice of the wake-up word or the instruction.

The geometric source separation module (GSS) 345 may receive input of an N-channel multiple audio input signal received via the N-channel multiple microphone-array, an M number of sound source direction information generated by the multiple sound source location localization module 341, and target sound source direction information generated by the target direction identification module (TDI) 343, and generate separated audio signals for the M number of different sound sources.

In detail, when the M number of sound source directions is known, a linear delay-and-sum beamformer filter coefficient for which a response from the respective sound source to the respective microphones of the N number of microphone-arrays is assumed as a far-field, and an inverse matrix of a sound source-to-microphone response matrix configured on the basis of the modeled linear delay-and-sum beamformer filter coefficient may be estimated and a separation filter matrix to separate a sound of each direction from the microphone-array signals may be obtained.

Commonly, a method for estimating an inverse matrix includes a second-order source separation method through diagonalization of a covariance matrix or correlation matrix between microphone signals of a certain interval, and a higher-order source separation method based on Infomax-independent component analysis (Infomax-ICA).

When a target function configured according to the respective methods is minimized or maximized using a gradient descent method or an ascent adaptation method, a separation filter matrix within the target function may be initialized to the response matrix or a penalty term including the response matrix based on direction information per signal frame for real-time convergence may be added to the target function.

The audio signal for each sound source separated in this way emphasizes a sound of the corresponding direction, but may include a sound of another direction and surrounding noise through interchannel leakage. Accordingly, the geometric source separation module (GSS) 345 may apply a post-filter for each of the M number of separation results and further eliminate this noise.

A stationary noise variance may be estimated through a noise estimation scheme such as Minima-controlled Recursive Average (MCRA), and a leakage noise variance may be obtained by multiplying another separation result by a predetermined weight. Then, on the basis of a final noise variance generated by adding the stationary noise variance and the leakage noise variance, a final gain function to extract only a sound of the corresponding direction from the respective separated channels may be calculated through a decision directed speech estimation scheme such as Optimally Modified Log-spectral Amplitude (OM-LSA).

The end-point detection module (EPD) 347 may receive input of the M number of audio signals generated by the geometric source separation module (GSS) 345, generate the M number of separated voice signals, and transfer the generated voice signals to the wake-up word recognition module (WUW) 349. The end-point detection module (EPD) 347 may detect a noise interval (frame) and a voice interval (frame) for the separated M number of audio signals in order to generate the separated voice signals respectively, and output an audio signal from a time when voice starts until a time the voice ends as a voice signal based on the detected noise interval and the detected voice interval.

In detail, when an utterance of voice is started, energy or entropy of a signal increases, and thus the end-point detection module (EPD) 347 may use this feature to identify a point with energy or entropy higher than or equal to a predetermined threshold as a starting point of a voice signal, and identify the reverse case as an end point of the voice signal.

Further, the end-point detection module (EPD) 347 may perform voice end-point detection using energy of a frequency band in which voice is present or another voice feature in consideration of a change to a voice frequency band, etc.

The end-point detection module (EPD) 347 according to an example embodiment may receive input of the M number of audio signals generated by the geometric source separation module (GSS) 345, generate a K M) number of voice signals, and transfer the generated K number of voice signals to the wake-up word recognition module (WUW) 349. That is, feature analysis may be made to the received separated audio signals and only a K number of sound sources which are identified as voice may be transferred to the wake-up word recognition word (WUW) 349, thereby reducing computational complexity and increasing noise responsiveness at the same time.

In detail, the end-point detection module (EPD) 347 may acquire features from the input separated audio signals, and compare a vector of the acquired feature with a vector of template of a pre-learned voice signal and identify whether the audio signal is voice or non-voice based on the similarity thereof. In this case, the features of the audio signals that may be employed may be a mel-frequency cepstral coefficient (MFCC), a linear-frequency cepstral coefficient (LFCC), a linear prediction coefficient (LPC), a frequency envelope, a zero-crossing rate (ZCR), etc.

The wake-up word recognition module (WUW) 349 may generate a wake-up word recognition result from the generated M number of separated voice signal and transfer the generated wake-up word recognition result to the target direction identification module (TDI) 343. In this case, the wake-up word recognition result may be a score which indicates whether or not the corresponding voice signal is an audio signal in which a wake-up word is uttered or a score which indicates the probability (chances) that the corresponding voice signal will be an audio signal in which the wake-up word is uttered. In addition, the wake-up word recognition result may include a channel number (or direction information of the corresponding separated sound source) at the time when a wake-up word recognition result is generated.

The processor 320 may control an overall operation of the electronic device 300. In particular, the processor 320 may read modules stored in the storage unit 340 described above, and perform an operation performed by the respective modules. According to an example embodiment, the respective modules illustrated in FIG. 4 or a combination thereof may be implemented in an additional processor different from the processor 320 or hardware of a System-On-Chip (SoC) form.

Hereinafter, the electronic device 100 and 300 according to various example embodiments will be described with reference to FIGS. 5 and 6.

Figure 5A:
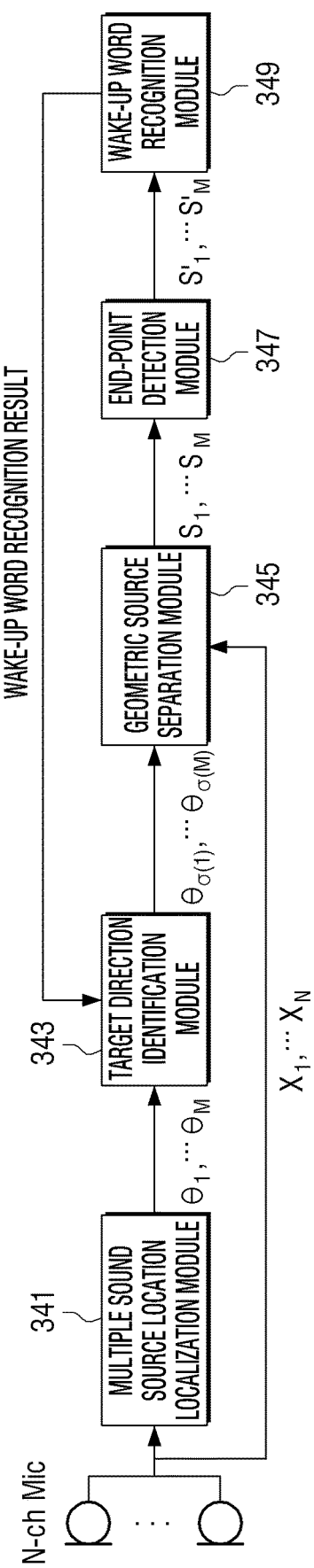
FIGS. 5A and 5B are diagrams illustrating an operation of an electronic device, according to an example embodiment.

FIG. 5A illustrates an operation of the electronic device 100 and 300, according to an example embodiment. The respective modules 341, 343, 345, 347 and 49 illustrated in FIG. 5A may respectively perform operations of the modules 341, 343, 345, 347 and 349 described with reference to FIG. 4.

That is, as illustrated in FIG. 5A, when audio signals generated by an M number of sound sources are received via a microphone-array of the N channel, the microphone-array of the N channel may transfer the N number of audio signals such as $X_1$ to $X_N$ to the multiple sound source location localization module 341 and the geometric source separation module (GSS) 345.

The multiple sound source localization module (MSSL) 341 may estimate a direction of arrival of sound sources from the N number of audio signals output from the microphone-array of the N channel, and generate the M pieces of sound source direction information such as $\theta_1$ to $\theta_M$ and transfer it to the target direction identification module (TDI) 343.

The target direction identification module (TDI) 343 may detect a target sound source on the basis of a duration of the M pieces of sound source direction information generated by the multiple sound source location localization module 341 and a wake-up word recognition result transferred from the wake-up word recognition module 343, and generate target sound source direction information, such as $\theta_{o(1)}$ to $\theta_{o(M)}$, for which index information is added to the sound source direction information.

The geometric source separation module (GSS) 345 may receive the N number of audio signals transferred from the microphone-array of the N channel and target sound source direction information generated by the multiple sound source location localization module 341 and the target direction identification module 343, and generate the M number of audio signals, such as $S_1$ to $S_M$, separated for the M number of different sound sources.

The end-point detection module (EPD) 347 may receive input of the M number of audio signals generated by the geometric source separation module (GSS) 345, generate the M number of separated voice signals such as $S'_1$ to $S'_M$, and transfer the generated voice signals to the wake-up word recognition module (WUW) 349.

The wake-up word recognition module (WUW) 349 may generate a wake-up word recognition result from the generated M number of separated voice signal and transfer the generated wake-up word recognition result to the target direction identification module (TDI) 343.

Upon wake-up word recognition, when it is determined that the voice signal separated for a target sound source direction of a first index is a wake-up word, a separated voice signal of the first index among the separated $S'_1$ to $S'_M$ signals to the voice recognition server.

Upon wake-up word recognition, when it is determined that the voice signal separated for the target sound source direction of the first index is not a wake-up word, the target sound source identification module 343 may add the first index to another target sound source direction corresponding to a separated voice signal recognized as a wake-up word, and accordingly, a separated voice signal of a direction from the wake-up word is recognized, that is, a sound source direction to which the first index is newly added, is transmitted to the voice recognition server.

Figure 5B:
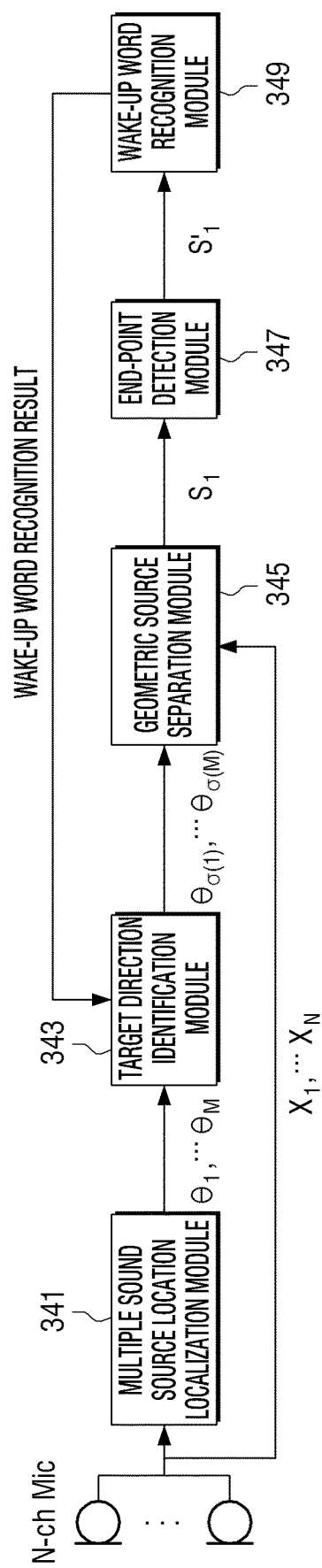

FIG. 5B is a diagram illustrating an operation of an electronic device 100 and 300, according to another example embodiment. An operation of the electronic device 100 and 300 as illustrated in FIG. 5A is to respond when multiple voices are present, whereas an operation of the electronic device 100 and 300 as illustrated in FIG. 5B is to respond when only one voice is present.

In detail, when operated using the method of FIG. 5A, it is necessary that the geometric source separation module (GSS) 345, the end-point detection module (EPD) 347 and the wake-up word recognition module 349 are driven in a multi-thread (or repeated computation of a single thread) form, which significantly increases computation complexity. Accordingly, to prevent such problem, the electronic device 100 and 300 may be operated using the method of FIG. 5B.

Referring to FIG. 5B, the target direction identification module (TDI) 343 may identify one target sound source direction, the geometric source separation module (GSS) 345 may separate only an audio signal $S_1$ to the determined one target sound source direction and transfer it to the end-point detection module (EPD) 347, and like the $S'_1$, the end-point detection module (EPD) 347 may transfer only one voice signal to the wake-up word recognition module 349. Thereby, computational complexity can be reduced.

According to another example embodiment, the electronic device 100 and 300 may be operated as in FIG. 5B, when one target sound source is determined by the target direction identification module 343, and may be operated as in FIG. 5A, when two or more target sound sources are determined. In this case, the target direction identification module (TDI) 343 may serve to determine which of the operation method of FIG. 5A and the operation method of FIG. 5B is to be used.

According to another example embodiment, the electronic device 100 and 300 may, during initial operation, assume the presence of multiple voices and be operated using the method of FIG. 5A, but may be operated using the method of FIG. 5B, when a target sound source determined by the target direction identification module 343 is recognized as a wake-up word.

According to another example embodiment, in a case that no target sound source is detected, the electronic device 100 and 300 may identify a channel number (or a direction of the corresponding separated sound source) at the time when the previous wake-up word recognition result is generated as a target sound source direction, and be operated using the method of FIG. 5B. In this case, all events that have occurred within a predetermined range surrounding the target sound source direction may be determined as a target sound source. Thereafter, when no utterance is continuously detected for over a predetermined time, there may be a timeout and the electronic device 100 and 300 may be operated using the method of FIG. 5A.

Figure 6A:
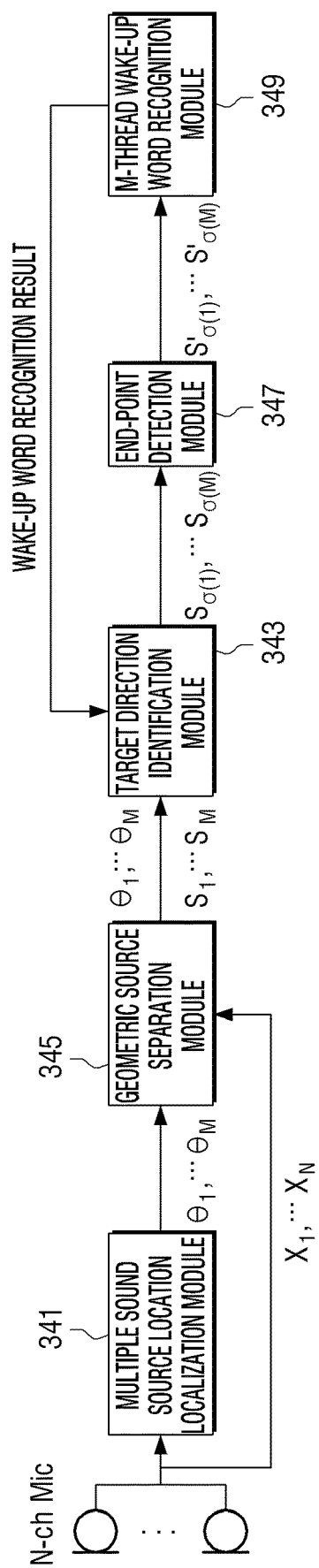
FIGS. 6A and 6B are diagrams illustrating an operation of an electronic device, according to another example embodiment.

FIG. 6A is a diagram illustrating an operation of an electronic device 100 and 300, according to another example embodiment. The operation methods as in FIGS. 5A and 5B includes receiving input of the M pieces of sound source direction information by the target direction identification module 343, whereas the operation method of FIG. 6A is an operation method including receiving the M number of separated audio signals by the target direction identification module 343.

In this case, the geometric source separation module (GSS) 345 may receive input of the M pieces of sound source direction information ($\theta_1$ to $\theta_M$) generated by the multiple sound source location localization module 341, and generate audio signals ($S_1$ to $S_M$) which are separated for the M number of different sound sources. The generated M number of separated audio signals and the M pieces of sound source direction information may be transferred to the target direction identification module (TDI) 343.

The target direction identification module (TDI) 343 may analyze the received M number of separated audio signals and the received M pieces of sound source direction information and detect a target sound source, and generate separate audio signals ($S_{o(1)}$ to $S_{o(M)}$) to which the target sound source direction information is added, and transfer the generated audio signals to the end-point detection module (EPD) 347. In this case, the target direction identification module (TDI) 343 may generate separate audio signals ($S_{o(1)}$ to $S_{o(M)}$) to which the target sound source direction information is added, on the basis of a duration of each of sound source direction information. The generated audio signals ($S_{o(1)}$ to $S_{o(M)}$) to which the target sound source direction information is added may be those to which index information indicating whether the separated audio signal is voice or noise is added, those to which index information indicating what ordinal number of target sound source the corresponding sound source direction corresponds to, or those for which an order of sound sources of the M number of separated audio signals has been changed in accordance with a predetermined rule (for example, voice 1, voice 2, noise 1 and noise 2).

Meanwhile, the end-point detection module (EPD) 347 may receive input of the M number of separated audio signals ($S_{o(1)}$ to $S_{o(M)}$) to which the target sound source direction information generated by the target direction identification module (TDI) 343 is added, generate the M number of separated voice signals, and transfer the generated voice signals to the wake-up word recognition module (WUW) 349. The generated separated voice signal may be generated by detecting a noise interval (frame) and a voice interval (frame) from the separated audio signals received by the end-point detection module (EPD) 347, and based on this, outputting an audio signal from a time point when voice starts to a time point when the voice ends as a voice signal.

According to an example embodiment, the end-point detection module (EPD) 347 may analyze features of the received separate audio signals and transfer only a K number of sound sources which are identified as voice to the wake-up word recognition module (WUW) 349. That is, the target direction identification module (TDI) 343 may primarily select a voice sound source on the basis of a duration of direction of a sound source, and the end-point detection module (EPD) 347 may apply a voice/non-voice classification scheme based on an audio signal feature analysis and finally identify a target sound source direction.

Figure 6B:
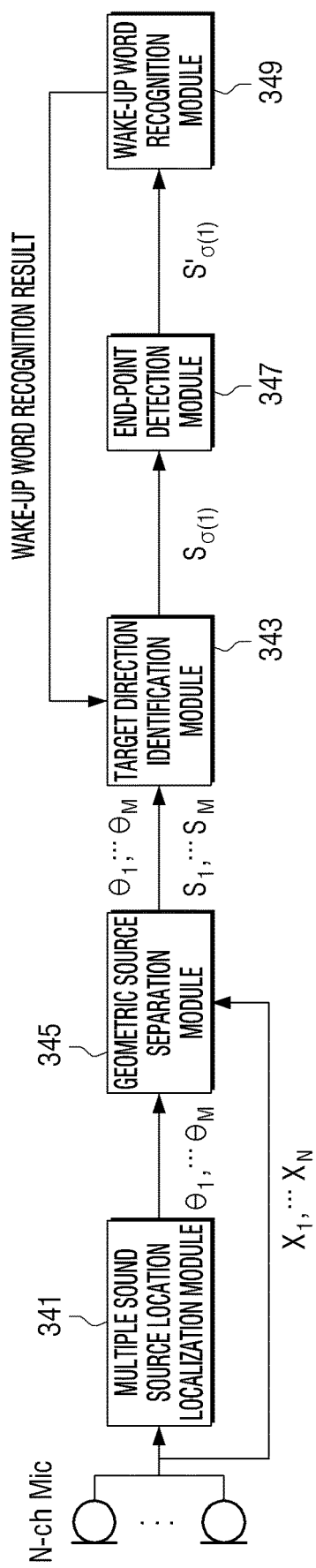

FIG. 6B is a diagram illustrating an operation of an electronic device 100 and 300, according to yet another example embodiment. The operation method of FIG. 6A is a method for responding to multiple voices, whereas that of FIG. 6B is a method for responding to single voice. The operation of the electronic device 100 and 300 using the method of FIG. 6A may cause a significant increase in computational complexity, and thus, to prevent such problem, the electronic device 100 and 300 may be operated using the method of FIG. 6B.

Referring to FIG. 6B, the target direction identification module (TDI) 343 of the electronic device 100 and 300 may receive the audio signals ($S_1$ and $S_M$) separated by the geometric source separation module (GSS) 345 and the sound source direction information ($\theta_1$ to $\theta_M$) generated by the multiple sound source location localization module (MSSL) 341, and determine one audio signal which is determined to be closest to voice among them and output the determined audio signal as an audio signal ($S_{o(1)}$) of a target sound source. In this case, a method for determining a target sound source may be a method based on a duration of direction of each of the separated sound sources, or may be a method of analyzing features of a received separate sound source and identifying a sound source determined as voice as a target sound source. Accordingly, the end-point detection module (EPD) 347 may output only one voice signal ($S'_{o(1)}$) to the wake-up word recognition module (WUW) 349 as well. Accordingly, computational complexity can be reduced.

In the example described above, voice recognition of a wake-up word is performed in the electronic device 100 and 300, but for a user's voice command for controlling an external device after the wake-up word recognition, the electronic device 100 and 300 transmits the corresponding audio signal to a voice recognition server and the voice recognition server performs voice recognition.

However, the example is not limited thereto. In a case that a high performance voice recognition module (not shown) is provided in the electronic device 100 and 300, the processor 120 and 320 may perform voice recognition of an external device control command by means of the provided voice recognition module (not shown), and control the communication unit 130 and 330 to directly transmit a control signal corresponding to the recognized voice to an external device, and thereby the electronic device 100 and 300 can directly control operations of the external device without using the voice recognition server.

Figure 7:
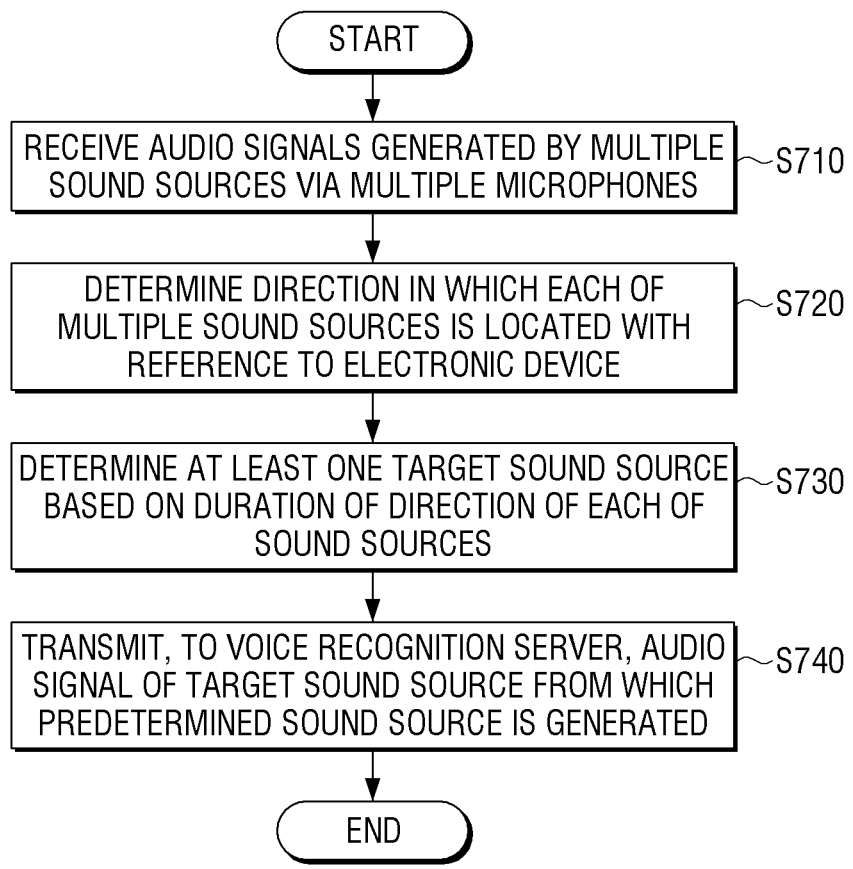
FIG. 7 is a flowchart illustrating a method for processing audio signals of an electronic device, according to an example embodiment.

FIG. 7 is a flowchart illustrating a method for processing audio signals of an electronic device, according to an example embodiment. In FIG. 7, the same elements described above will not be described in detail.

Referring to FIG. 7, when audio signals generated from multiple sound sources are received via multiple microphones at operation S710, the electronic device 100 and 300 may identify a direction of each of the multiple sound sources with reference to the electronic device 100 and 300 on the basis of the multiple audio signals received via the multiple microphones, at operation S720. According to an example embodiment, the electronic device 100 and 300 may identify a direction of each of the multiple sound sources of a less number than the multiple microphones.

Accordingly, the electronic device 100 and 300 may identify at least one target sound source among multiple sound sources on the basis of the duration of the determined sound source direction, at operation S730. In detail, the electronic device 100 and 300 may determine at least one sound source generating an audio signal in the same direction for less than a predetermined time among multiple sound sources as a target sound source.

Then, the electronic device 100 and 300 may transmit an audio signal of a target sound source from which predetermined voice is generated among at least one target sound source to a voice recognition server, at operation S740.

In detail, according to an example embodiment, the electronic device 100 and 300 may separate an audio signal of each of the multiple sound sources from an audio signal received from each of the multiple microphones, and perform voice recognition of the separated multiple audio signals and identify a target sound source from which predetermined voice is generated.

According to an example embodiment, if only one target sound source is present, the electronic device 100 and 300 may separate only audio signals of a target sound source from an audio signal received from each of the multiple microphones, and perform voice recognition of the separated audio signal of the target sound source and identify whether the predetermined voice is generated.

According to yet another example embodiment, the electronic device 100 and 300 may determine a target sound source from which voice is generated among the at least one target source, and perform voice recognition of only an audio signal of the determined target sound source and identify a target sound source from which the predetermined voice is generated.

Accordingly, the electronic device 100 and 300 may transmit, to the voice recognition server, only an audio signal of a target sound source from which predetermined voice is determined to be generated among the audio signals received from each of the multiple microphones after the target sound source from which the predetermined voice is generated is identified.

According to an example embodiment, the electronic device 100 and 300 may display a direction of a target sound source from which predetermined voice is generated with reference to a location of the electronic device 100 and 300.

According to the various example embodiments, a target sound source for voice recognition among multiple external sound sources may be accurately identified. Accordingly, effective and stable voice recognition can be performed in various noise environments as well.

According to the various example embodiments, audio signals input to multiple microphones are separated based on a direction of arrival of a sound source and the separated sound sources are transferred to a voice recognizer in the order from highest possibility of being voice to lowest, and thereby stable voice recognition performance can be secured in an environment with intensive noise.

In addition, when a direction of arrival of voice is identified to transfer a voice command among the separated sound sources to the recognizer, a direction of voice may be predicted based on continuity of arrival direction of a sound source, and thus it is possible to identify a voice command with less computational complexity.

In addition, a method for identifying whether or not a sound source is voice by analyzing features of the separated sound source to identify a direction of arrival of voice can increase discrimination of non-voice noise.

In addition, the previous wake-up word recognition result generated by the voice recognizer may be used to identify an arrival direction of voice, and thus user's uttered voice of which a level of utterance is lowered after the wake-up word utterance can be more effectively acquired.

Operations of the processor of the electronic device and audio signal processing methods of the electronic device according to various example embodiments may be embodied in software and mounted to the electronic device. For example, a non-transitory computer readable medium which stores a program for performing a method for processing audio signals of an electronic device including receiving audio signals generated by multiple sound sources via multiple microphones; determining the direction in which each of the multiple sound sources is located with reference to the electronic device, on the basis of the multiple audio signals received through the multiple microphones; determining at least one target sound source among the multiple sound sources on the basis of the duration of the determined direction of each of the sound sources; and transmitting, to the voice recognition server, an audio signal of a target sound source from which predetermined voice is generated among the at least one target sound source may be provided.

The non-transitory computer readable recording medium indicates a medium which stores data semi-permanently and can be read by devices, rather than a medium storing data temporarily, such as register, cache, or memory. In detail, the above-described various middleware or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

Although example embodiments of the present disclosure have been illustrated and described, it should be understood that the present disclosure is not limited to the disclosed embodiments and may be variously changed without departing from the spirit and the scope of the present disclosure. While the disclosure has been shown and described with reference to various embodiments thereof, it will be understood by those skilled in the art that various changes in form and details may be made therein without departing from the spirit and scope of the disclosure as defined by the appended claims and their equivalents. While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device, comprising:
a plurality of microphones;
a communication unit; and
a processor configured to:
based on audio signals provided by a plurality of sound sources being received through the plurality of microphones, identify a direction in which each of the plurality of sound sources is located with respect to the electronic device,
identify at least one target sound source among the plurality of sound sources based on a duration of the direction of each of the plurality of sound sources,
control the communication unit to transmit, to a voice recognition server, an audio signal of a target sound source from which a predetermined voice is provided among the at least one target sound source,
wherein the processor is further configured to identify at least one sound source of which the duration is less than a predetermined time among the plurality of sound sources as the at least one target sound source.

2. The electronic device as claimed in claim 1, wherein the processor is further configured to:
separate the audio signals received from each of the plurality of sound sources; and
perform voice recognition on the separated audio signals and identify a target sound source from which the predetermined voice is provided.

3. The electronic device as claimed in claim 2, wherein the processor is further configured to control the communication unit to transmit, to the voice recognition server, only an audio signal of the target sound source identified to provide the predetermined voice among the audio signals received by the each of the plurality of microphones after the target sound source from which the predetermined voice is provided is identified.

4. The electronic device as claimed in claim 1, wherein the processor is further configured to:
   based on only one target sound source being present,
   separate only an audio signal of the target sound source from audio signals received from each of the plurality of microphones; and
   perform voice recognition on the audio signal of the separated target sound source and identify whether the predetermined voice is provided.

5. The electronic device as claimed in claim 1, wherein the processor is further configured to:
   identify a target sound source generating a voice among the at least one target sound source; and
   perform voice recognition on only an audio signal of the target sound source to provide the voice, and identify the target sound source from which the predetermined voice is provided.

6. The electronic device as claimed in claim 1, wherein the processor is further configured to identify a direction in which each of the plurality of sound sources is present, and
   wherein a number of directions of the each of the plurality of sound sources is less than a number of the plurality of microphones.

7. The electronic device as claimed in claim 1, further comprising:
   a display configured to display a direction in which a target sound source from which the predetermined voice is provided is present with respect to the electronic device.

8. A method for processing an audio signal of an electronic device, the method comprising:
   receiving by a plurality of microphones, audio signals provided by a plurality of sound sources;
   identifying a direction in which each of the plurality of sound sources is located with respect to the electronic device based on the audio signals received through the plurality of microphones;
   identifying at least one target sound source among the plurality of sound sources based on a duration of the direction of each of the plurality of sound sources; and
   transmitting, to a voice recognition server, an audio signal of the at least one target sound source from which a predetermined voice is provided,
   wherein the identifying is performed by identifying at least one sound source of which the duration is less than a predetermined time among the plurality of sound sources as the at least one target sound source.

9. The method as claimed in claim 8, further comprising:
   separating the audio signals received from each of the plurality of sound sources; and
   performing voice recognition on the separated audio signals as a target sound source and identifying a target sound source from which the predetermined voice is provided.

10. The method as claimed in claim 9, wherein the transmitting to the voice recognition server comprises:
    transmitting, to the voice recognition server, only an audio signal of the target sound source identified to provide the predetermined voice among the audio signals received by the each of the plurality of microphones after the target sound source from which the predetermined voice is provided is identified.

11. The method as claimed in claim 8, further comprising:
    based on only one target sound source being present,
    separating only an audio signal of the target sound source from audio signals received from each of the plurality of microphones; and
    performing voice recognition on the audio signal of the separated target sound source and determine whether the predetermined voice is provided.

12. The method as claimed in claim 8, further comprising:
    identifying a target sound source generating a voice among the at least one target sound source; and
    performing voice recognition on only an audio signal of the target sound source to provide the voice, and identifying the target sound source from which the predetermined voice is provided.

13. The method as claimed in claim 8, wherein the determining the direction further comprises:
    identifying a direction in which each of the plurality of sound sources is present,
    wherein a number of directions of the each of the plurality of sound sources is less than a number of the plurality of microphones.

\* \* \* \* \*